US008667385B1

(12) United States Patent
Mui et al.

(10) Patent No.: US 8,667,385 B1
(45) Date of Patent: Mar. 4, 2014

(54) METHOD AND SYSTEM FOR GENERATING AND SHARING ANALYTICS ANNOTATIONS

(75) Inventors: Lik Mui, Hayward, CA (US); Leo Baghdassarian, Mountain View, CA (US); Martin Ohman, Stockholm (SE); Elizabeth Liebert, Mountain View, CA (US); Hui Sok Moon, San Jose, CA (US); Japjit Tulsi, Los Altos, CA (US)

(73) Assignee: Google Inc., Mountain View, CA (US)

( * ) Notice: Subject to any disclaimer, the term of this patent is extended or adjusted under 35 U.S.C. 154(b) by 552 days.

(21) Appl. No.: 12/962,480

(22) Filed: Dec. 7, 2010

Related U.S. Application Data

(60) Provisional application No. 61/267,378, filed on Dec. 7, 2009.

(51) Int. Cl.
 *G06F 17/21* (2006.01)
(52) U.S. Cl.
 USPC ............ 715/231; 715/230; 715/232; 715/205
(58) Field of Classification Search
 USPC .......................... 715/205, 215, 230, 231, 232
 See application file for complete search history.

(56) References Cited

U.S. PATENT DOCUMENTS

| | | | | |
|---|---|---|---|---|
| 7,162,493 | B2 * | 1/2007 | Weiss et al. ............................ | 1/1 |
| 7,865,816 | B2 * | 1/2011 | Tanaka ............................ | 715/230 |
| 2006/0277087 | A1 * | 12/2006 | Error ................................ | 705/8 |
| 2008/0270223 | A1 * | 10/2008 | Collins et al. ..................... | 705/10 |
| 2009/0187639 | A1 * | 7/2009 | Furuhashi et al. ............. | 709/218 |
| 2010/0091022 | A1 * | 4/2010 | Shinohara et al. ............ | 345/440 |
| 2011/0029853 | A1 * | 2/2011 | Garrity et al. ................. | 715/215 |

OTHER PUBLICATIONS

Justin Kistner, "A look inside the Fall Release of Analytics 9", Nov. 16, 2009, Webtrends, http://blogs.webtrends.com/2009/11/a-look-inside-the-fall-release-of-analytics-9/.*
Justin Kistner, A look inside the Fall Release of Analytics 9, Nov. 16, 2009, Webtrends.com.*

* cited by examiner

*Primary Examiner* — Cesar Paula
*Assistant Examiner* — Seung Jung
(74) *Attorney, Agent, or Firm* — Foley and Lardner LLP; John D. Lanza

(57) ABSTRACT

A computer-implemented method for displaying annotations for a multidimensional dataset at a client device is disclosed. The client device is connected to a server system through a network. The client device displays a first view of the multi-dimensional dataset. The first view includes a first graph over a period of time and a plurality of annotations, each annotation corresponding to a respective time segment within the period of time. Upon receiving a user selection of one of the plurality of annotations, the client device displays a second view of the multidimensional dataset. The second view includes a second graph over the period of time and the plurality of annotation. Finally, the client device highlights the user-selected annotation among the plurality of annotations and the time segment corresponding to the user-selected annotation in the second graph.

18 Claims, 19 Drawing Sheets

METHOD AND SYSTEM FOR GENERATING AND SHARING ANALYTICS ANNOTATIONS

PRIORITY

This application claims priority under 35 U.S.C. 119(e) to U.S. Provisional Patent Application No. 61/267,378, filed Dec. 7, 2009, entitled "Method And System For Generating and Sharing Analytics Annotations", the content of which is incorporated by reference herein in its entirety.

TECHNICAL FIELD

The disclosed embodiments relate to the visualization of a multidimensional database, and in particular, to a system and method for generating and sharing analytics annotations between different users.

BACKGROUND

Web analytics is the measurement, collection, analysis and reporting of the traffic data of a web site for purposes of understanding and optimizing the web site usage. The traffic data is typically organized in the form of a multidimensional dataset whose metadata may include multiple dimensions and metric attributes (also known as "measures"). One method of performing web analytics is to visualize on a computer monitor different subsets of the multidimensional dataset that are defined by various machine-defined or user-specified configurations of dimensions and metric attributes. From examining the visualized traffic data, an information analyst may be able to discover information valuable for improving the quality and volume of the traffic to a web site. But the effort required for extracting and sharing with others any valuable information from the multidimensional dataset is usually non-trivial if the volume of the traffic data is significant or the metadata includes a large number of dimensions and metric attributes.

SUMMARY

In accordance with some embodiments described below, a computer-implemented method for displaying annotations for a multidimensional dataset at a client device is disclosed. The client device is connected to a server system through a network. The method includes: displaying a first view of the multidimensional dataset, wherein the first view includes a first graph over a period of time and a plurality of annotations, each annotation corresponding to a respective time segment within the period of time; receiving a user selection of one of the plurality of annotations; displaying a second view of the multidimensional dataset, wherein the second view includes a second graph over the period of time and at least a subset of the plurality of annotations; and, in some embodiments, highlighting the user-selected annotation among the plurality of annotations and the time segment corresponding to the user-selected annotation in the second graph.

In accordance with some embodiments described below, a computer-implemented method for generating annotations for a multidimensional dataset at a client device is disclosed. The client device is connected to a server system through a network. The method includes: displaying a graph of at least a subset of the multidimensional dataset over a period of time, wherein the graph includes a plurality of graph segments and each graph segment depicts the corresponding portion of the dataset for a respective time segment within the period of time; in response to a request by a first user to generate an annotation for one or more user-selected time segments, displaying an annotation template adjacent to the graph, wherein the annotation template includes information indicating the user-selected time segments and a text field for entering an annotation; receiving an annotation entered by the first user into the text field; and upon completion of user entry of the annotation, displaying the annotation adjacent to the graph and an annotation icon adjacent to the one or more user-selected time segments.

In accordance with some embodiments described below, a client device for displaying annotations for a multidimensional dataset is disclosed. The client device is connected to the server system through a network. The client device includes one or more processors for executing programs and memory to store data and to store one or more programs to be executed by the one or more processors. The one or more programs include instructions for: displaying a first view of the multidimensional dataset, wherein the first view includes a first graph over a period of time and a plurality of annotations, each annotation corresponding to a respective time segment within the period of time; receiving a user selection of one of the plurality of annotations; displaying a second view of the multidimensional dataset, wherein the second view includes a second graph over the period of time and at least a subset of the plurality of annotations; and, in some embodiments, highlighting the user-selected annotation among the plurality of annotations and the time segment corresponding to the user-selected annotation in the second graph.

In accordance with some embodiments described below, a computer readable-storage medium storing one or more programs for execution by one or more processors of a client device for displaying annotations for a multidimensional dataset is disclosed. The client device is connected to the server system through a network. The one or more programs include instructions for: displaying a first view of the multidimensional dataset, wherein the first view includes a first graph over a period of time and a plurality of annotations, each annotation corresponding to a respective time segment within the period of time; receiving a user selection of one of the plurality of annotations; displaying a second view of the multidimensional dataset, wherein the second view includes a second graph over the period of time and at least a subset of the plurality of annotations; and, in some embodiments, highlighting the user-selected annotation among the plurality of annotations and the time segment corresponding to the user-selected annotation in the second graph.

BRIEF DESCRIPTION OF DRAWINGS

The aforementioned embodiment of the invention as well as additional embodiments will be more clearly understood as a result of the following detailed description of the various aspects of the invention when taken in conjunction with the drawings. Like reference numerals refer to corresponding parts throughout the several views of the drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
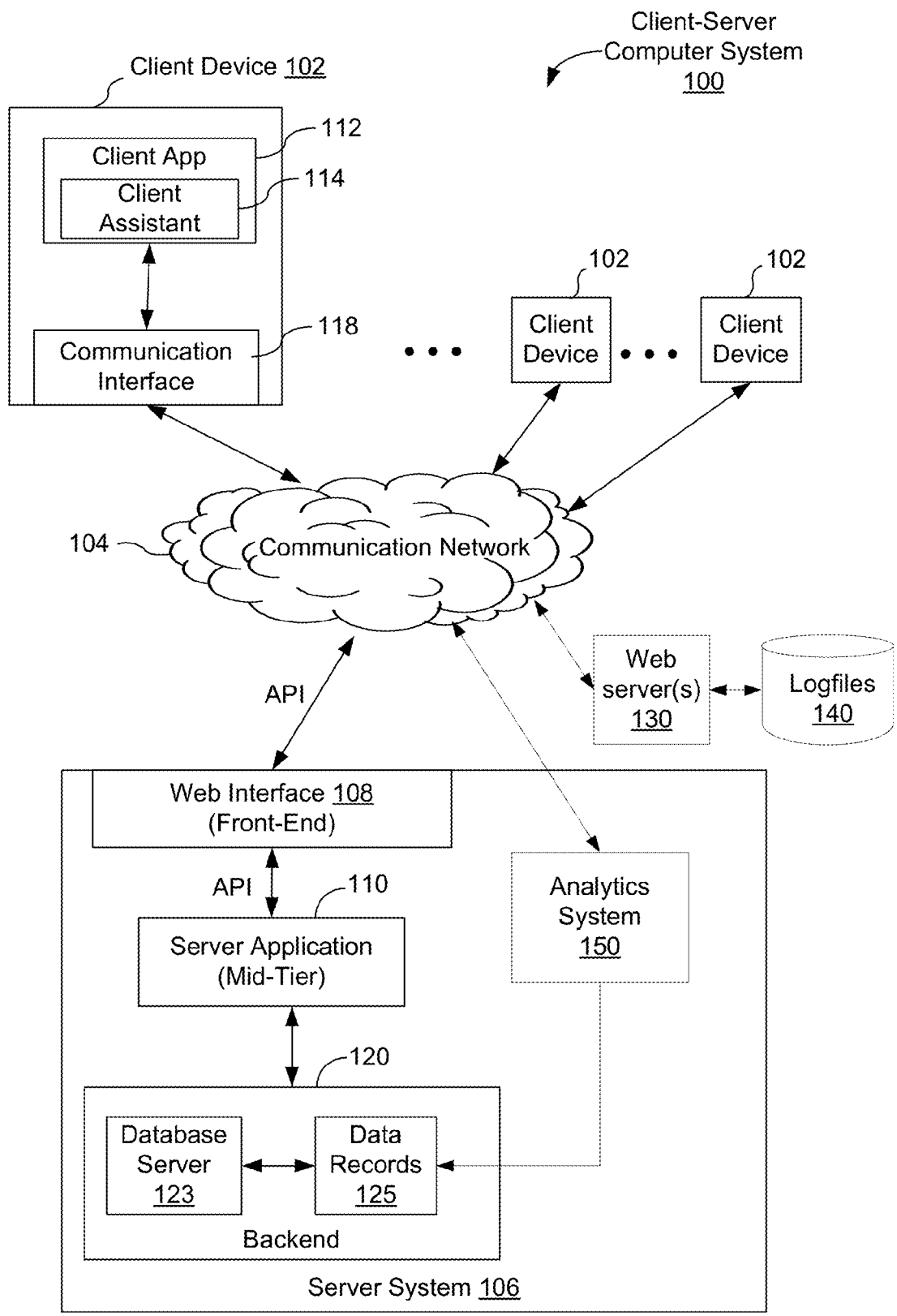
FIG. 1 is an overview block diagram of a client-server server system for visualizing multidimensional datasets in accordance with some embodiments.

FIG. 1 is an overview block diagram of a client-server server system 100 for visualizing multidimensional datasets in accordance with some embodiments. The client-server server system 100 includes a plurality of client devices 102 connected to a server system 106 through one or more communication networks 104.

A client device 102 (also known as a "client") may be any computer or similar device through which a user of the client device 102 can submit data access requests to and receive results or other services from the server system 106. Examples include, without limitation, desktop computers, laptop computers, tablet computers, mobile devices such as mobile phones, personal digital assistants, set-top boxes, or any combination of the above. A respective client 102 may contain at least one client application 112 for submitting requests to the server system 106. For example, the client application 112 can be a web browser or other type of application that permits a user to access the services provided by the server system 106.

In some embodiments, the client application 112 includes one or more client assistants 114. A client assistant 114 can be a software application that performs tasks related to assisting a user's activities with respect to the client application 112 and/or other applications. For example, the client assistant 114 may assist a user at the client device 102 with browsing information (e.g., web pages), processing information (e.g., query results) received from the server system 106, and monitoring the user's activities on the query results. In some embodiments, the client assistant 114 is embedded in a web page (e.g., a query results web page) or other documents downloaded from the server system 106. In some embodiments, the client assistant 114 is a part of the client application 112 (e.g., a plug-in application of a web browser). The client 102 further includes a communication interface 118 to support the communication between the client 102 and other devices (e.g., the server system 106 or another client device 102).

The communication network(s) 104 can be any wired or wireless local area network (LAN) and/or wide area network (WAN), such as an intranet, an extranet, the Internet, or a combination of such networks. In some embodiments, the communication network 104 uses the HyperText Transport Protocol (HTTP) and the Transmission Control Protocol/Internet Protocol (TCP/IP) to transport information between different networks. The HTTP permits client devices to access various information items available on the Internet via the communication network 104. The various embodiments of the invention, however, are not limited to the use of any particular protocol.

In some embodiments, the server system 106 includes a web interface 108 (also referred to as a "front-end server"), a server application 110 (also referred to as a "mid-tier server"), and a backend server 120. The web interface 108 receives data access requests from client devices 102 and forwards the requests to the server application 110. In response to receiving the requests, the server application 110 decides how to process the requests including identifying data filters associated with a request, checking whether it has data available for the request, submitting queries to the backend database 120 for data requested by the client, processing the data returned by the backend database 120 that matches the queries, and returning the processed data as results to the requesting clients 102. After receiving a result, the client application 112 at a particular client 102 displays the result to the user who submits the original request.

In some embodiments, the backend database 120 is effectively a database management system including a database server 123 that is configured to manage a large number of data records 125 stored at the server system 106. In response to a query submitted by the server application 110, the database server 123 identifies zero or more data records that satisfy the query and return the data records to the server application 110 for further processing. More detailed descriptions of the operations within the backend database 120 are provided below in connection with FIGS. 3 and 4B.

In some embodiments, the server system 106 is an application service provider (ASP) that provides web analytics services to its customers (e.g., a web site owner) by visualizing the traffic data generated at a web site in accordance with various user requests. To do so, the server system 106 may include an analytics system 150 adapted for processing the raw traffic data of a web server 130 such as the logfiles 140 and other types of traffic data generated by the web server 130 through techniques such as page tagging. The raw web traffic data is first processed into a multidimensional dataset that includes multiple dimensions and multiple metric attributes (or measures) before the server system 106 can answer any data visualization requests through the web interface 108. A more detailed description of the processing of raw web traffic data can be found in the U.S. Provisional Patent Application No. 61/181,275, filed May 26, 2009, entitled "System and Method for Aggregating Analytics Data" and the U.S. Provisional Patent Application No. 61/181,276, filed May 26, 2009, entitled "Dynamically Generating Aggregate Tables"

the contents of which are incorporated by reference herein in their entirety. For simplicity, it is assumed herein that the data records managed by the backend database 120 and accessible to the server application 110 are not the raw web traffic data, but the data after being pre-processed.

Figure 2:
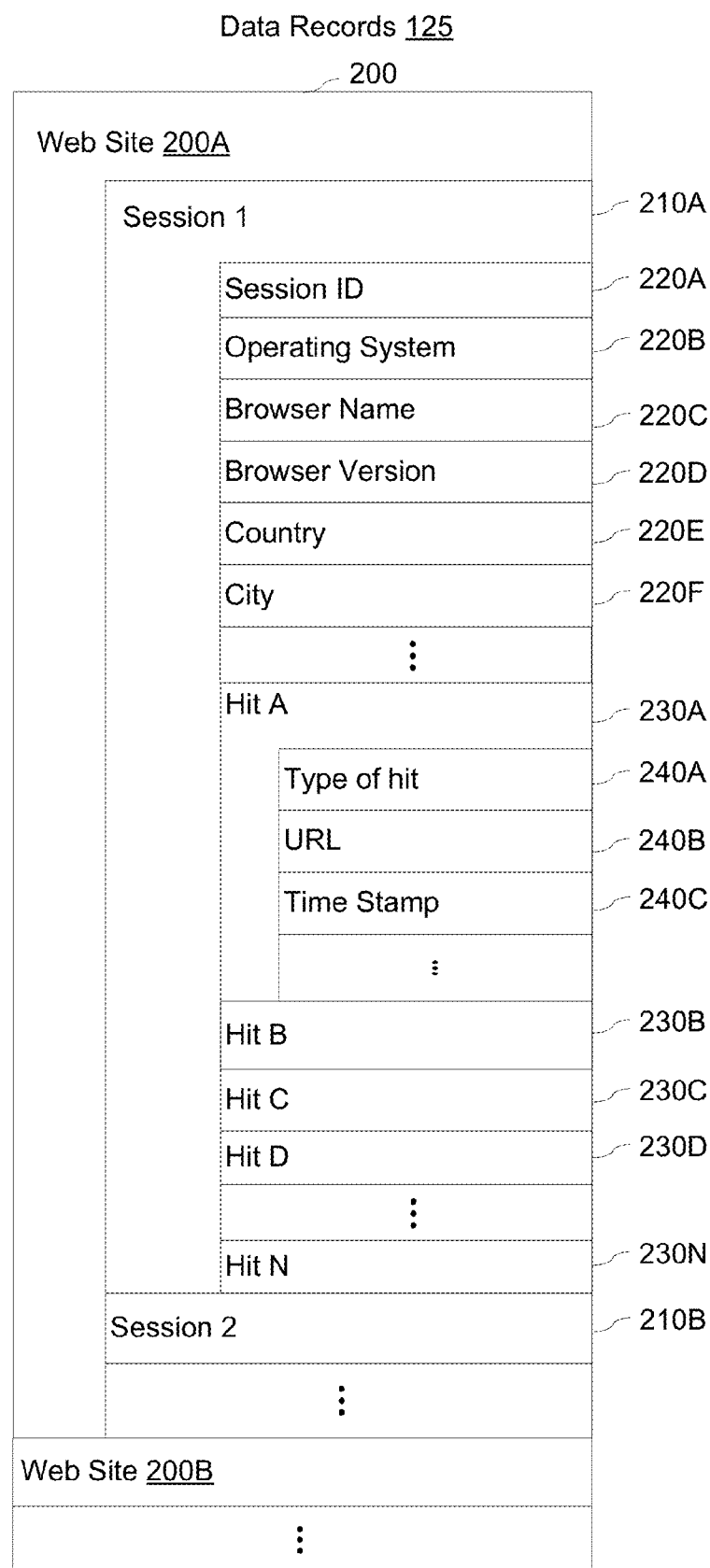
FIG. 2 is a block diagram of a data structure that stores traffic data at different web sites in accordance with some embodiments.

FIG. 2 is a block diagram of a data structure 200 used for storing the pre-processed web traffic data at different web sites in accordance with some embodiments. The web data stored in the data structure 200 have a hierarchical structure. The top level of the hierarchy corresponds to different web sites 200A, 200B (i.e., different web servers). For a respective web site, the traffic data is grouped into multiple sessions 210A, 210B, each session having a unique session ID 220. A session ID uniquely identifies a user's session with the web site 200A for the duration of that user's visit. Within a session 210A, other session-level attributes include operating system 220B (i.e., the operating system the computer runs on from which the user accesses the web site), browser name 220C (i.e., the web browser application used by the user for accessing the web site) and browser version 220D, geographical information of the computer such as the country 220E and the city 220F, etc.

For convenience and custom, the web traffic data of a user session (or a visit) is further divided into one or more hits 230A to 230N. Note that the terms "session" and "visit" are used interchangeably throughout this application. In the context of web traffic, a hit typically corresponds to a request to a web server for a document such as a web page, an image, a JavaScript file, a Cascading Style Sheet (CSS) file, etc. Each hit 230A may be characterized by attributes such as type of hit 240A (e.g., transaction hit, etc.), referral URL 240B (i.e., the web page the visitor was on when the hit was generated), a timestamp 240C that indicates when the hit occurs and so on. Note that the session-level and hit-level attributes as shown in FIG. 2 are listed for illustrative purposes only. As will be shown in the examples below, a session or a hit may have many other attributes that either exist in the raw traffic data (e.g., the timestamp) or can be derived from the raw traffic data by the analytics system 150 (e.g., the average pageviews per session).

Referring back to FIG. 1, a user at a client device 102 submits a request to the server system 106 for generating a report of the web traffic data associated with a particular web site. Upon receipt of the request, the server application 110 generates or identifies one or more queries and submits the queries to the backend server 120 that manages the web site's "sessionized" traffic data in the data structure 200 and processes the query results returned by the backend server 120 such that they can be visualized at the client device 102 in the form of a web analytics report.

Figure 3:
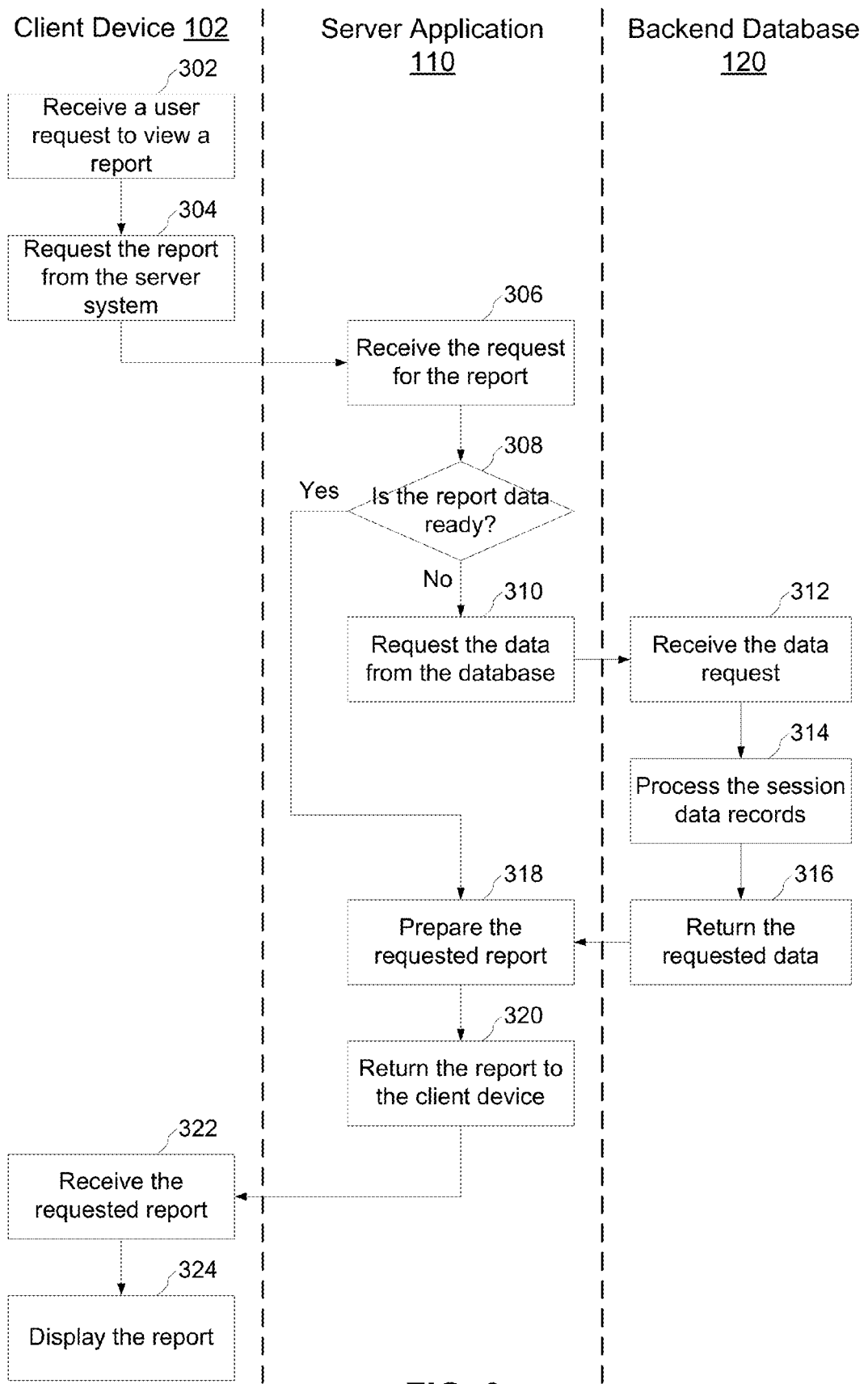
FIG. 3 is a flow chart of a process for generating a web analytics report in accordance with some embodiments.

FIG. 3 is an overview flow chart of a process for generating a web analytics report in accordance with some embodiments. The process begins with the client device 102 receiving a user-provided request to view a report of the web traffic data for a specific web site in a user-specified manner (302). In some embodiments, a user first logs into his or her account at the server system 106 through a web browser window. The web browser window may include one or more default analytics reports of the traffic data prepared by the server system 106 in accordance with pre-existing analytics report definitions stored at the server system 106 for the specific web site. As will be described below in detail, the user can customize the definition of an existing analytics report or define a new analytics report based on his or her specific needs. In response to a user selection of a particular web analytics report, the client device 102 submits a request for the report to the server system 106 (304).

Within the server system 106, the web interface 108 receives the request and forwards the request to the server application 110. In some embodiments, the client request is received in the form of one or more data packets defined by a communication protocol. The web interface 108 may perform predefined operations such as extracting information from the data packets and grouping the extracted information together into a format understood by the server application 110. Upon receipt of the client request for the analytics report (306), the server application 110 may check whether the client-requested traffic data for preparing the report is ready or not (308). In some embodiments, the current client request may follow an earlier client request and the two requests correspond to the same set of data records that have been generated or identified by the server application 110 in response to the earlier request. Thus, there is no need for the server application 110 to resubmit any new queries to the backend database 120.

If the client-requested data is available (308, yes), the server application 110 then prepares the analytics report using the existing data (318) and returns the report to the requesting client device (320). In some embodiments, the server application 110 prepares the analytics report by identifying a client-requested portion of a set of data records in the analytics report that was generated in response to a previous request and customizing the client-requested portion in a format to be rendered at the client device 102.

If the report-requested data is not available (308, no), the server application 110 needs to generate or identify one or more queries (or data filters) and submit the queries for the data to the backend database 120 (310). In some embodiments, the server application 110 converts the client request into one or more database queries or data filters, stores the queries in the server system 106, and applies them to the backend database 120. Upon receipt of the data filters (312), the database 120 processes the session-based web traffic data records as shown in FIG. 2 (314) to identify those data records that satisfy the data filters. At the end of the process, the backend database 120 returns the identified data records to the server application 110 for preparing the analytics report (316). Note that the reply from the backend database 120 may be empty if no data is found that satisfies the data filters. Based on the reply from the backend database 120, the server application 110 prepares the requested analytics report (318) and returns the report to the client device (320). In either case, the client device 102 receives the requested analytics report (322) and displays the report (324), from which the user may derive useful information embedded in the web traffic data.

Note that different users, depending on, e.g., their own experience and background knowledge regarding a website, may have different perspectives or information to share with other users. For example, one user can share his or her observations or thoughts in an email message to others. But without the visual context of the data reports, it is hard for one user to accurately deliver such information through text-based messages. Thus, one embodiment of the present application is directed to a method of annotating the data reports through a user interface at a client device and sharing the annotations between different users or different data reports.

As will be explained below in more detail, in some embodiments, one user can generate an annotation record through the user interface and associate the annotation record with a graphical representation of a data report (which is deemed to be the origin of the annotation record). The user who generates the annotation record can share the record with others or keep it private. This feature requires that the annotation record be submitted to and stored at the server system. In some embodiments, the annotation record is present in more than one data report but can easily bring back the origin data report through a single user click.

Figure 4A:
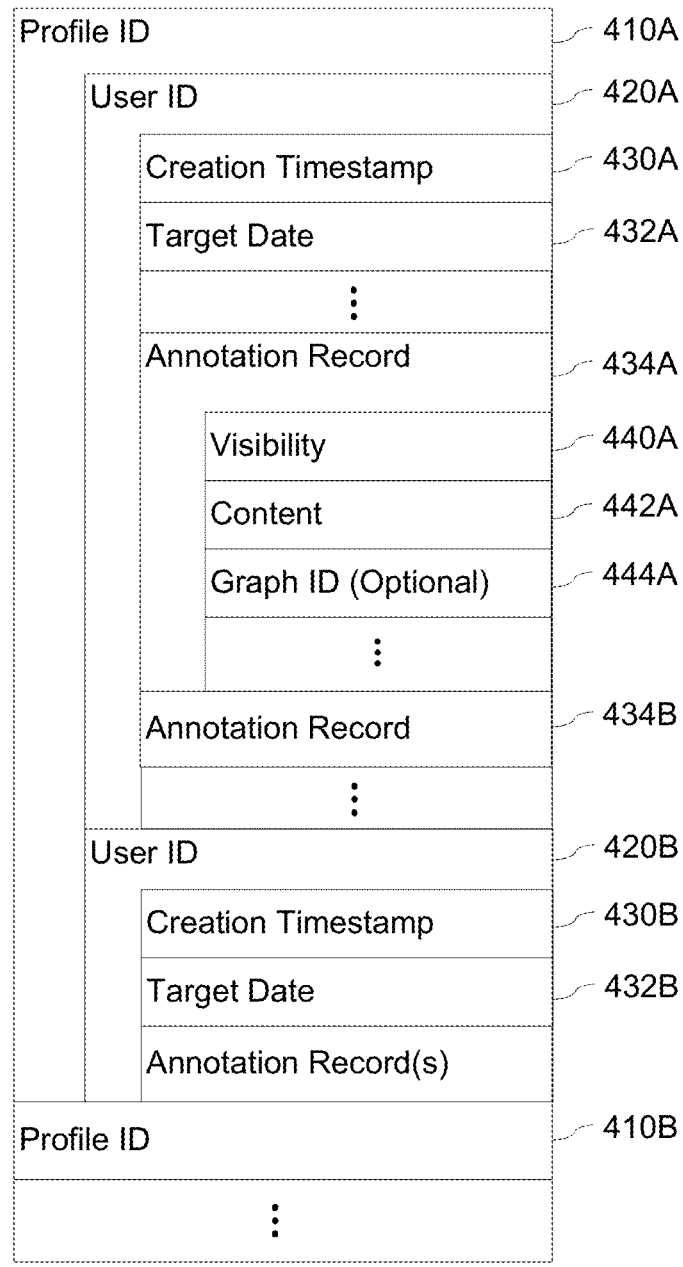
FIG. 4A is a block diagram of a data structure for storing annotation records at a server system in accordance with some embodiments.

FIG. 4A is a block diagram of a data structure for storing annotation records at a server system in accordance with some embodiments. Upon receipt of an annotation record from a client device, the server system generates an entry for the annotation record in the database 120: In some embodiments, the server system organizes the annotation records 400 such that different annotation records associated with the same website are identified by the same Profile ID (410A, 410B), which uniquely identifies the website in the server system. The annotation records associated with the same website are further grouped by their respective User IDs (420A, 420B), Creation Timestamps (430A, 430B), and Target Dates (432A, 432B). As such, a unique combination of a Profile ID and a User ID can identify all the annotation records generated by a user (User ID) for the data reports of a particular website (Profile ID). A unique combination of a Profile ID, a User ID, and a Target Date can identify all the annotation records generated by a user (User ID) for the data reports of a particular website (Profile ID) at a specific date (Target Date).

In some embodiments, each individual annotation record (434A, 434B) includes the following parameters:
  Visibility (440A)—The visibility of the annotation record to a user at a client device. There are two possible choices: (i) "Private," i.e., limiting the visibility of the annotation to the authoring user itself, and (ii) "Shared," i.e., allowing other users to view the annotation. In some embodiments, the default value of a newly-created annotation record is "Shared," which can be modified to be "Private" by the user subsequently.
  Content (442A)—The textual description of the annotation record entered by a user through a user interface at a client device. In some embodiments, there is a default limit on the length of the description (e.g., 160 characters).
  Graph ID (442A)—The optional graphical representation of the dataset that triggers the creation of the annotation record. In some embodiments, this parameter refers to the view of the dataset when the annotation record was generated. For example, if the annotation record was generated when the user was looking at the "Bounce Rate" view, "Bounce Rate" can be the Graph ID and the "Bounce Rate" view is the graph that originates the annotation record (also referred to as the origin of the annotation record).

Figure 4B:
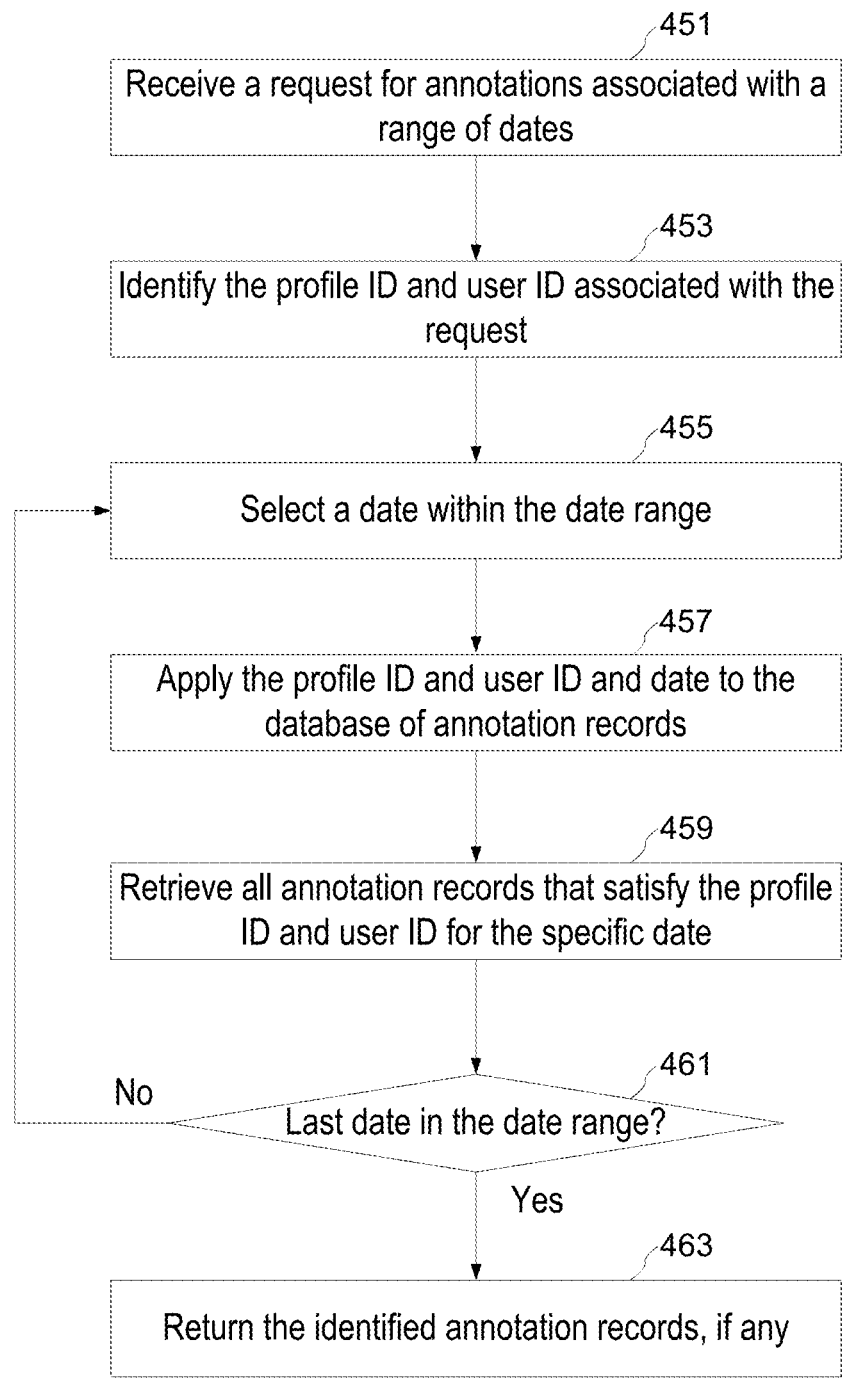
FIG. 4B is a flow chart of a process for retrieving annotation records in response to a client request in accordance with some embodiments.

FIG. 4B is a flow chart of a process for retrieving annotation records in response to a client request in accordance with some embodiments. Note that this process typically occurs at the server system 106 (e.g., at the backend database 120) in connection with the operation of preparing a data report, e.g., a report on the number of daily visits to a website for the last 30 days, for a client device.

The backend database 120 receives a request for annotations associated with the data report for a specific range of dates (451). As noted above, the annotation records are grouped by the server system in accordance with their Profile ID, User ID, Creation Timestamp, and Target Date. Therefore, the backend database 120 first identifies the Profile ID and User ID associated with the request (453) based on the data report being prepared in response to a client request.

For each date within the specific range of dates (455), the backend database 120 applies a query to the database using a combination of the Profile ID, the User ID, and the date as the Target Date (457) and retrieves the annotation records that match the combination of the three parameters. The backend database 120 repeats the operations (455, 457, 459) until the last date in the date range has been processed (461-yes). These retrieved annotation records, if any, are to be returned to the client device and displayed to a user who initiates the request (463).

Figure 5:
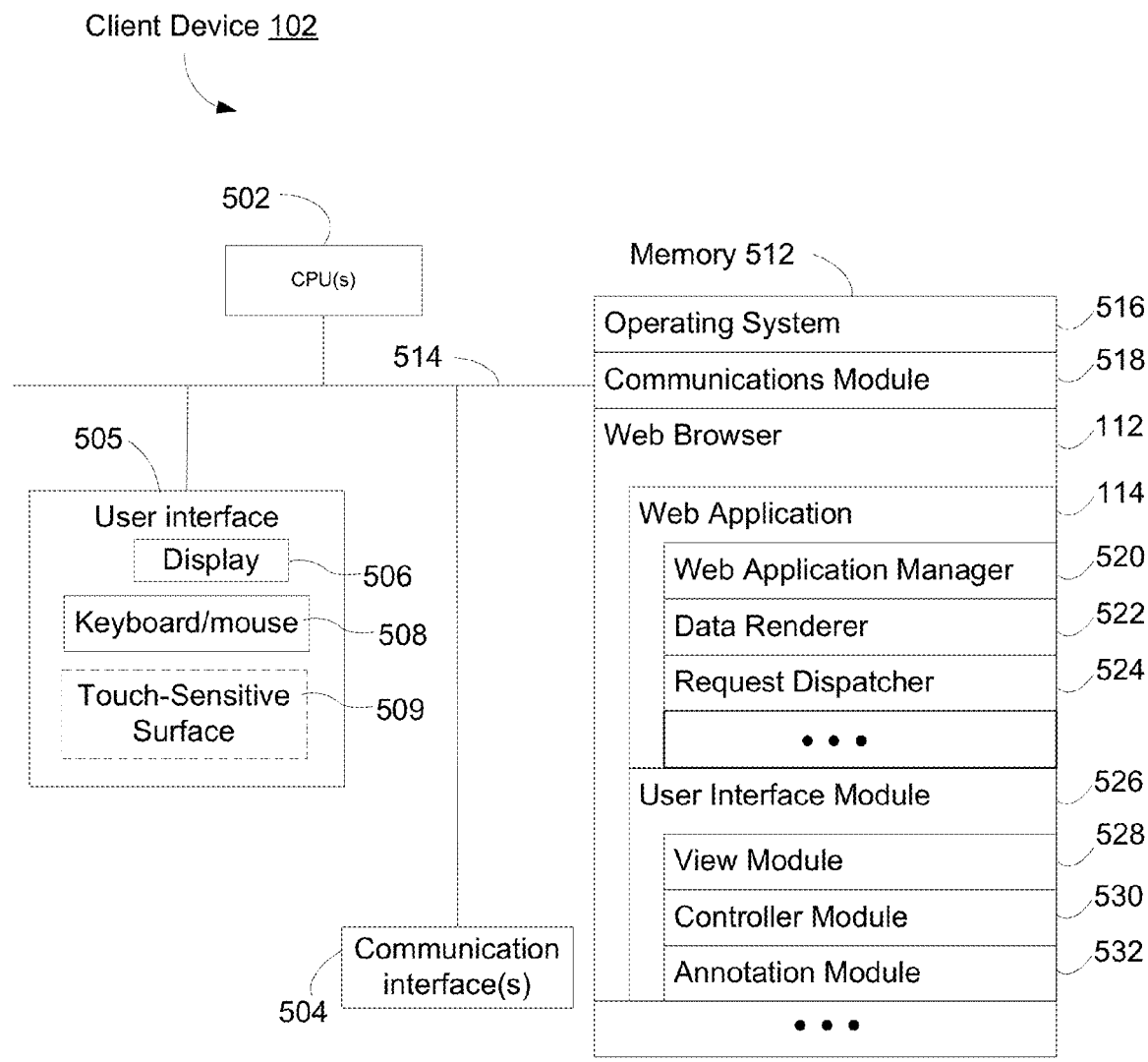
FIG. 5 is a block diagram of a client device for visualizing traffic data in accordance with some embodiments.

FIG. 5 is a block diagram of a client device 102 for visualizing web traffic data in accordance with some embodiments. The client device 102 generally includes one or more processing units (CPU's) 502, one or more network or other communications interfaces 504, memory 512, and one or more communication buses 514 for interconnecting these components. The communication buses 514 may include circuitry (sometimes called a chipset) that interconnects and controls communications between components. The client device 102 may optionally include a user interface 505, for instance, a display 506, a keyboard and/or mouse 508, and a touch-sensitive surface 509. Memory 512 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 512 may include mass storage that is remotely located from the central processing unit(s) 502. Memory 512, or alternately the non-volatile memory device(s) within memory 512, comprises a computer readable storage medium. Memory 512 or the computer readable storage medium of memory 512 stores the following elements, or a subset of these elements, and may also include additional elements:
  an operating system 516 that includes procedures for handling various basic system services and for performing hardware dependent tasks;
  a network communication module 518 that is used for connecting the client device 102 to other servers or computers including the server system 106 via one or more communication network interfaces 504 (wired or wireless), such as the Internet, other wide area networks, local area networks, and metropolitan area networks and so on;
  a client application 112 (e.g., a web browser), including one or more client assistants 114 (e.g., toolbar, browser plug-in) for monitoring the activities of a user; in some embodiments, the client assistant 114, or a portion thereof, may include a web application manager 520 for managing the user interactions with the web browser, a data render 522 for supporting the visualization of an analytics report, and a request dispatcher 524 for submitting user requests for new analytics reports; and
  a user interface module 526, including a view module 528, a controller module 530 and an annotation module 532, for detecting user instructions to control the visualization of the analytics reports in accordance with the user instructions. In some embodiments, the annotation module 532 is responsible for requesting the annotation records from the server system, displaying the annotations associated with an analytics report, generating/modifying annotation records in response to user instructions, and submitting newly-generated or modified annotation records to the server system (see, e.g., descriptions below in connection with FIGS. 7A to 8G).

Figure 6:
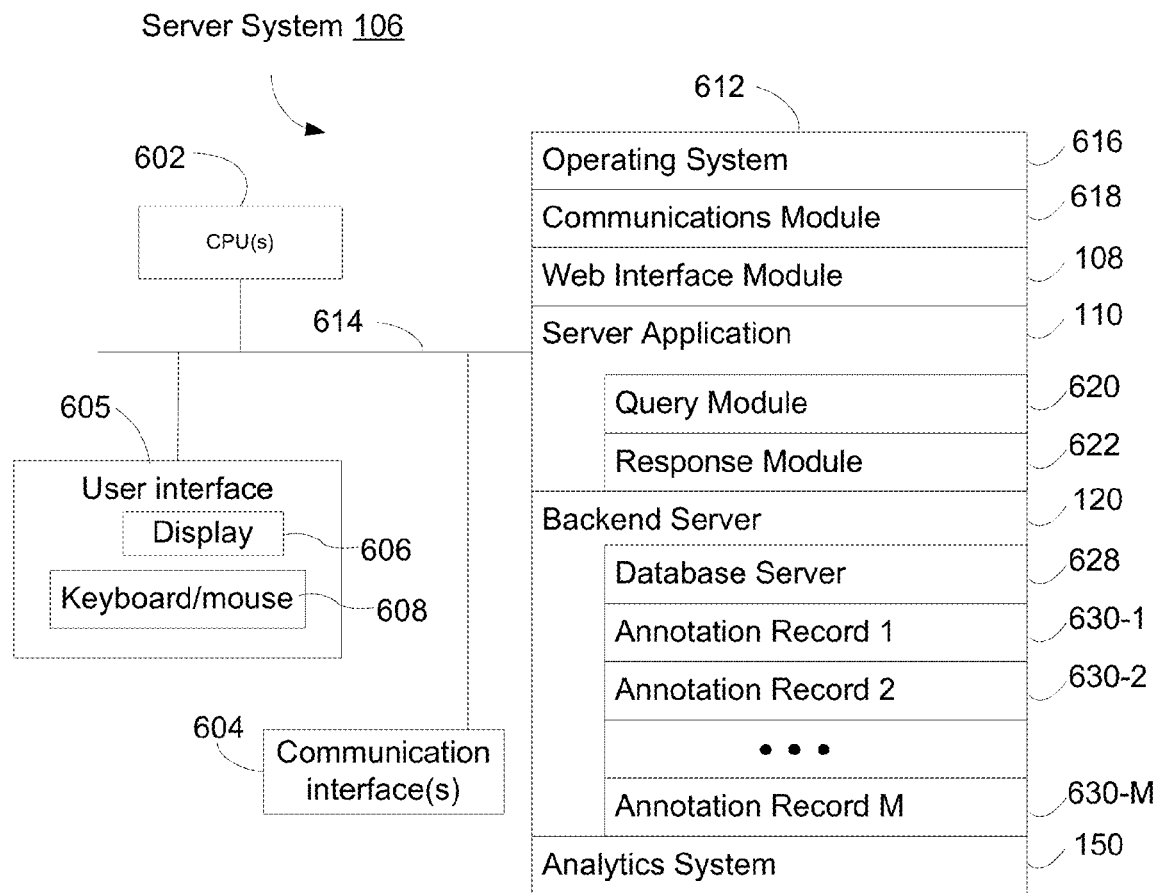
FIG. 6 is a block diagram of a server system for generating views of traffic data to be displayed at a requesting client device in accordance with some embodiments.

FIG. 6 is a block diagram of a server system 106 for generating views of web traffic data report to be displayed at a requesting client device in accordance with some embodiments. The server system 106 generally includes one or more processing units (CPU's) 602, one or more network or other communications interfaces 604, memory 612, and one or more communication buses 614 for interconnecting these components. The server system 106 may optionally include a user interface 605 comprising a display device 606 and a keyboard 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a computer readable storage medium. Memory 612 or the computer readable storage medium of memory 612 stores the following elements, or a subset of these elements, and may also include additional elements:

- an operating system 616 that includes procedures for handling various basic system services and for performing hardware dependent tasks;
- a network communication module 618 that is used for connecting the server system 106 to other computers such as the clients 102 and the web servers 130 via the communication network interfaces 604 (wired or wireless) and one or more communication networks, such as the Internet, other wide area networks, local area networks, metropolitan area networks, and so on;
- a web interface module 108 for receiving requests from client devices and returning reports in response to the client requests;
- a server application 110, including a query module 620 for converting client requests into one or more queries or data filters targeting at the backend database 120 and a response module 622 for preparing analytics reports based on the response from the backend database 120;
- a backend database 120 including a database server 628 and a large number of data records such as the session data records shown in FIG. 2 and such the annotation records 630-1 to 630-M shown in FIG. 4A; in some embodiments, the database server 123 is responsible for generating new annotation records in the backend database 120 in response to a client request (as detailed below in connection with FIG. 8A) and identifying and returning a set of annotation records to the requesting client device in connection with the other data records (as explained above in connection with FIG. 4B); and
- a web analytics system 150 for pre-processing the log files into the sessionized data records.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 and 612 may store a subset of the modules and data structures identified above. Furthermore, memory 512 and 612 may store additional modules and data structures not described above.

FIGS. 5 and 6 are intended more as functional descriptions of the various features of a client device and server system rather than a structural schematic of the embodiments described herein. In practice, and as recognized by those of ordinary skill in the art, items shown separately could be combined and some items could be separated. For example, some items shown separately in FIG. 6 like the web interface module 108 and the server application 110 could be implemented on a single server and single items like the database 120 could be implemented by multiple servers. The actual number of server computers used to implement the server system 106, and how features are allocated among them will vary from one implementation to another, and may depend in part on the amount of data traffic that the system must handle during peak usage periods as well as during average usage periods.

Figure 7A:
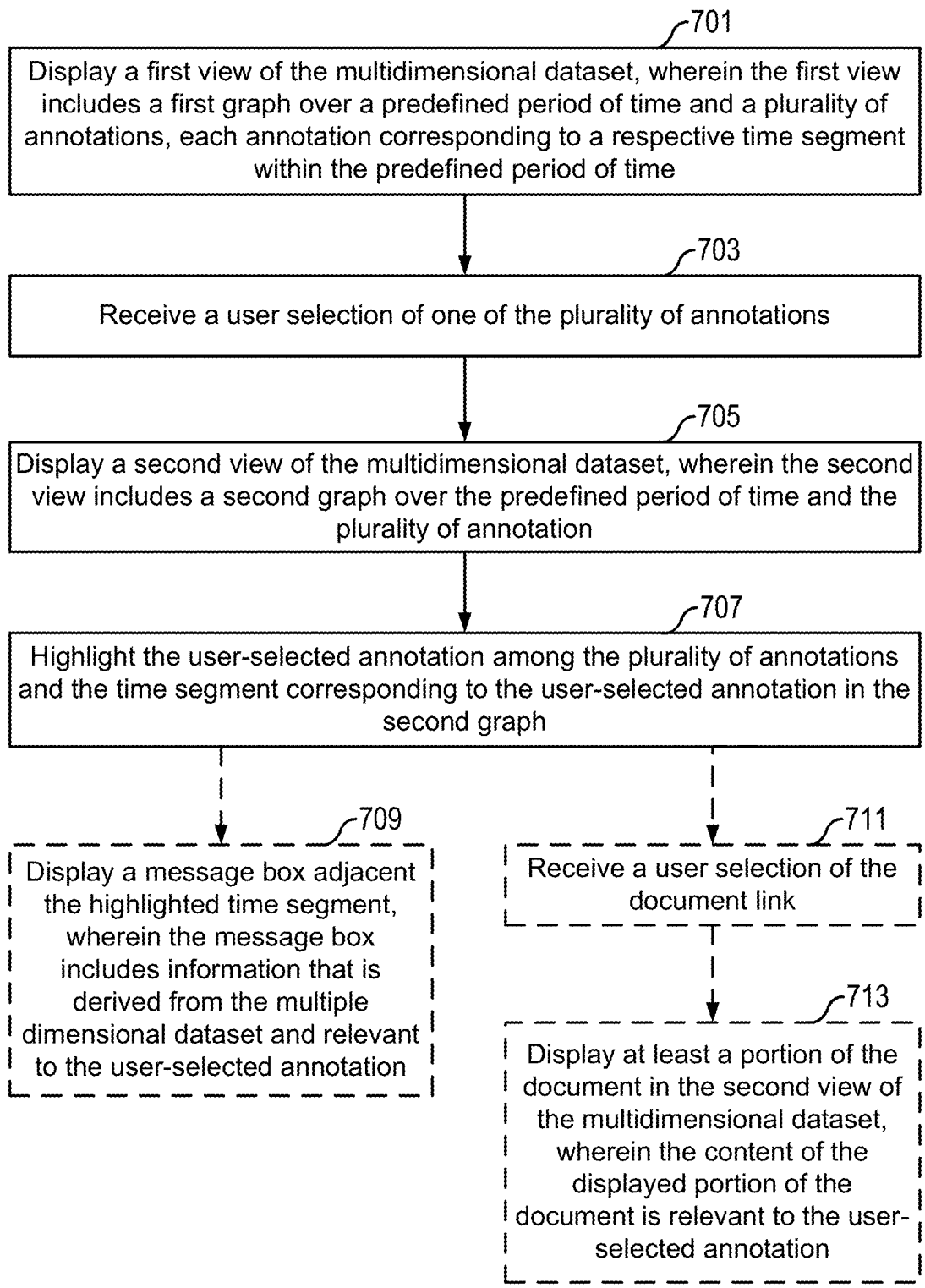
FIG. 7A is a flow chart of a computer-implemented method for displaying annotation records at a client device in response to user requests in accordance with some embodiments.

FIG. 7A is a flow chart of a computer-implemented method for displaying annotation records associated with a multidimensional dataset at a client device in response to user requests in accordance with some embodiments. In some embodiments, the method of FIG. 7A is implemented in the client-side annotation module 532 (FIG. 5). FIGS. 7B to 7F are screenshots illustrative of the computer-implemented method described in FIG. 7A in accordance with some embodiments. The multidimensional dataset is characterized by a set of dimension attributes and a set of metric attributes. The client device is connected to a server system through a network.

In response to a first user request, the client device retrieves from the server system data relating to a first subset of the multidimensional dataset and displays a first view (e.g., 720 in FIG. 7B) of the multidimensional dataset using the retrieved data (701). In some embodiments, the first view includes a first graph (e.g., the Ecommerce Conversion Rate graph 722 in FIG. 7B) over a predefined period of time (e.g., the 30-day period 724 in FIG. 7B) and a plurality of annotations (e.g., the annotations 726 in FIG. 7B), each annotation corresponding to a respective annotation icon (e.g., the icon 725 in FIG. 7B) and a respective time segment (e.g., a date 728 in FIG. 7B) within the predefined period of time and the identity (e.g., the email address 730 in FIG. 7B) of the author who generated the annotation. Note that the 2-D curves as depicted in the present application are for illustrative purpose. The present application is application to any other type of data visualization schemes such as bar chart, pie chart, etc.

In some embodiments, upon receiving a user selection (e.g., a mouse click 732 on an annotation shown in FIG. 7B) of one of the plurality of annotations (703), the client device displays a second view (e.g., the view 740 in FIG. 7C) of the multidimensional dataset (705). In some embodiments, the second view includes a second graph (e.g., the Revenue graph 722 in FIG. 7C) over the predefined period of time (e.g., the 30-day period 744 in FIG. 7C) and the plurality of annotations (e.g., the annotations 746 in FIG. 7C). In some embodiments, the client device highlights the user-selected annotation (e.g., by displaying in bold type the date, "11/13/2009," for the annotation 748-1 in FIG. 7C) among the plurality of annotations and the time segment (e.g., the highlight bar 748-2 in FIG. 7C) corresponding to the user-selected annotation in the second graph (707). In some embodiments, the highlighting schemes include larger fonts, different colors and many other well-known techniques.

Figure 7B:
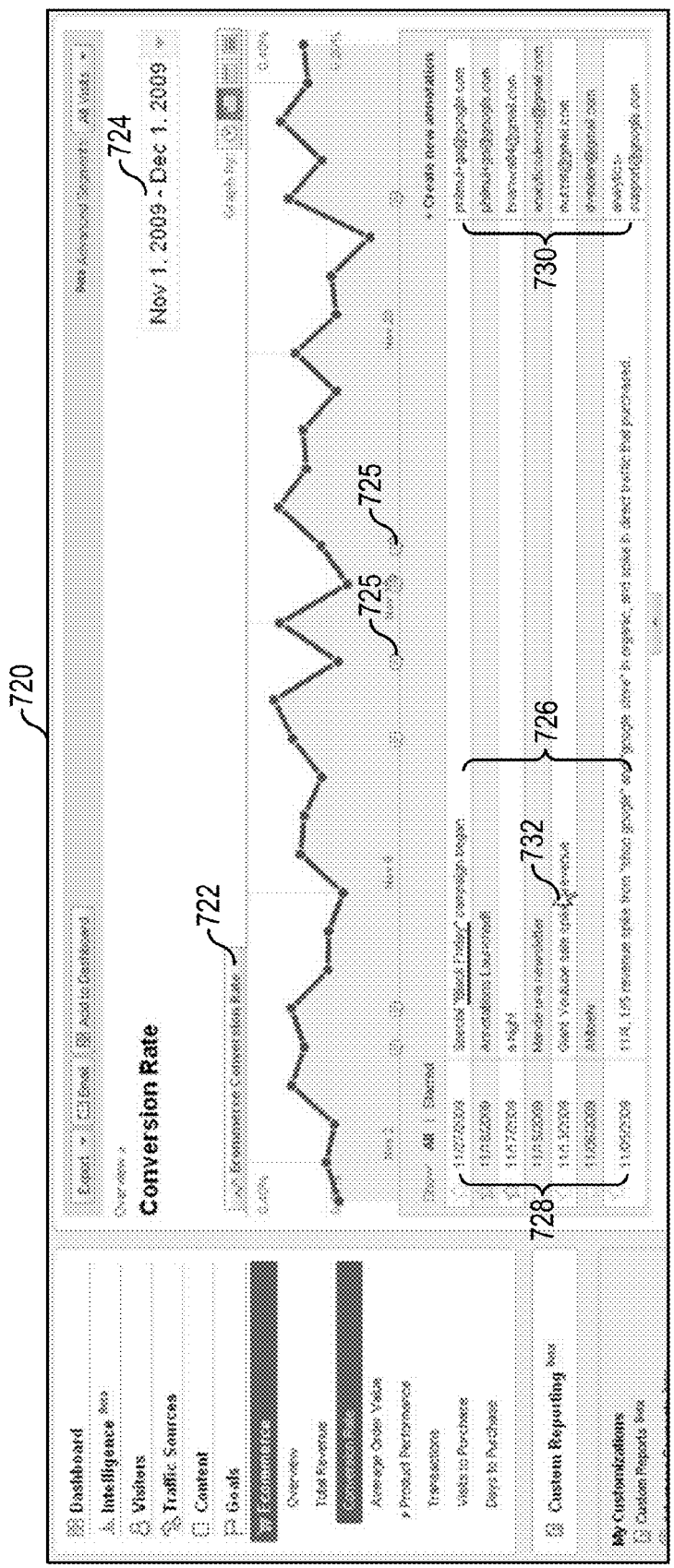
FIGS. 7B to 7F are screenshots illustrative of the computer-implemented method described in FIG. 7A in accordance with some embodiments.

In some embodiments, the first graph corresponds to a first subset of the multidimensional dataset and the second graph corresponds to a second subset of the multidimensional dataset that is different from the first subset. For example, the graph in FIG. 7B depicts the data corresponding to the "Ecommerce Conversion Rate" metric attribute of the dataset and the graph in FIG. 7C depicts the data corresponding to the "Revenue" metric attribute of the dataset.

In some embodiments, the second graph is the user-selected annotation's origin graph. Note that the content of the user-selected annotation in FIG. 7B is "Giant Youtube sale spike revenue" for the date of Nov. 13, 2009. The corresponding graph segment of the graph 722, however, does not look dramatically different from the other segments. In other words, this graph is probably not the origin graph of the annotation record although the annotation record is present in the 720 view. As described above in connection with FIG. 4A, the annotation record in the server system includes the graph ID that corresponds to the graph 742 in FIG. 7C. Therefore, in response to a user selection of the annotation, the annotation module at the client device submits a request to the server system to retrieve the origin graph associated with the annotation. In some embodiments, the data subset presented in the second graph is selected by the user. In other embodiments, the data subset presented in the second graph is determined by the annotation module 532 based on characteristics of a selected annotation; in some embodiments, the annotation module 532 automatically requests from the server and displays the data subset that corresponds to the origin graph of the selected annotation.

Figure 7C:
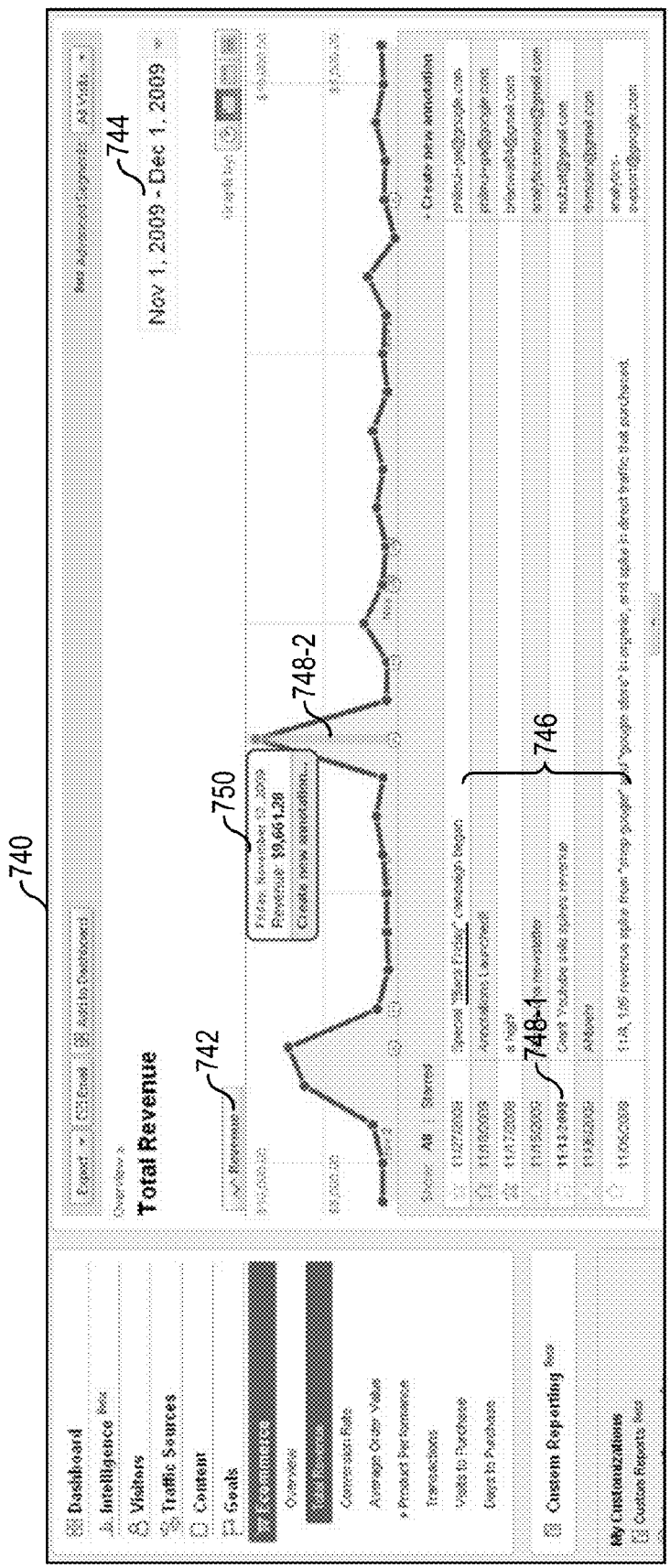
Figure 7D:
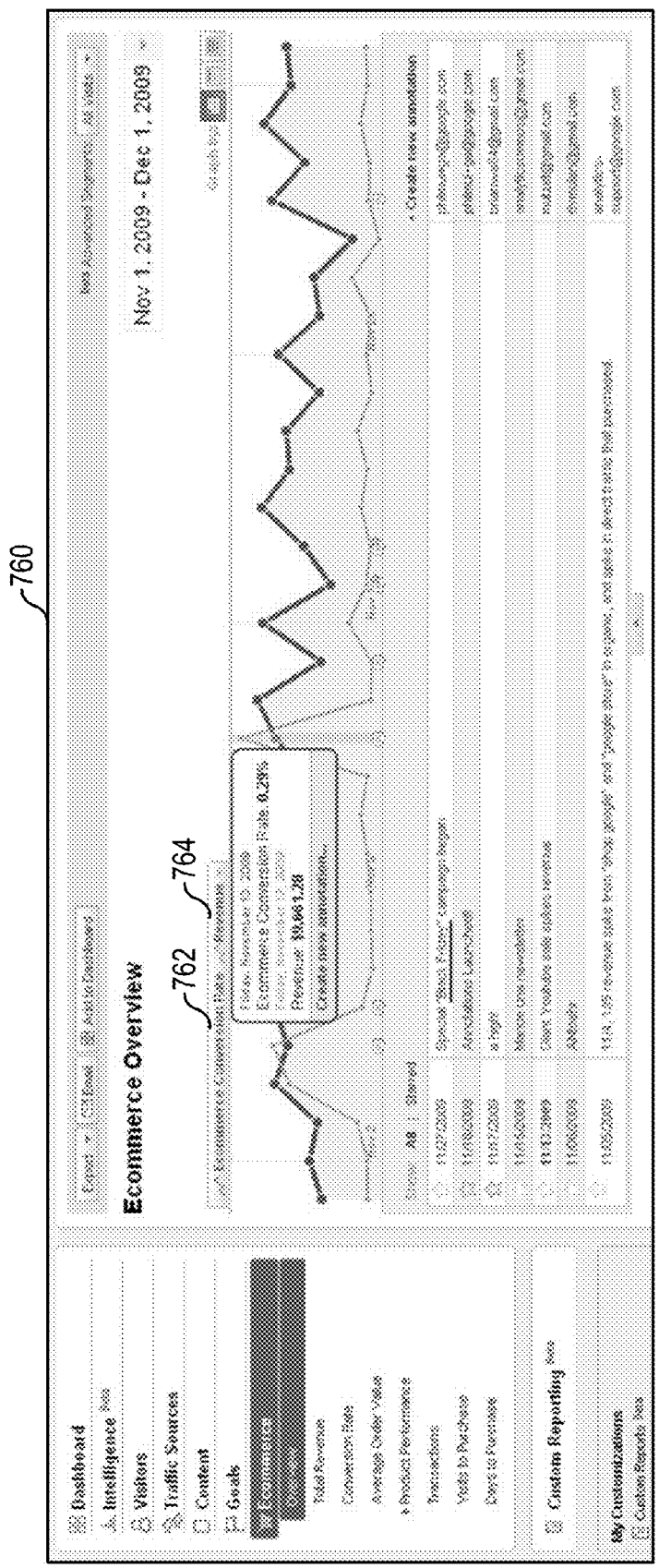

As shown in FIG. 7C, there is a huge jump of revenue on Friday, Nov. 13, 2009. In contrast, the revenues for the adjacent to dates are much lower than that on Nov. 13, 2009. If a user visiting the web page was aware that there was a promotion at www.youtube.com during approximately the same time period and believes that this explains the "abnormal" revenue, he or she may choose to generate the annotation attributing the significant revenue increase to the activity at the website. In doing so, the user shares his or her knowledge about the promotion with other users who might have thought that the "abnormal" revenue was caused by suspicious activities and then wasted more resources investigating the cause behind the spike without such information.

In some embodiments, the client device also displays a message box (e.g., the message box 750 in FIG. 7C) adjacent to the highlighted time segment (709). The message box includes information that is derived from the multidimensional dataset and relevant to the user-selected annotation. For example, the message box 750 indicates that the total amount of revenue for Nov. 13, 2009 is $9,661.28, which is significantly higher than the revenues at other dates. In this example, the annotation module 532 chooses to display revenue information for the selected annotation 748-1 since the origin graph for that annotation was generated from revenue data. In some embodiments, the message box 750 may include other information (e.g., the average revenue over the 30-day period) that is deemed valuable to the user.

In some embodiments, rather than replacing the first view with the second view, the client device includes both the first graph (e.g., the conversion rate graph 762 in FIG. 7D) and the second graph (e.g., the revenue graph 764 in FIG. 7D) in the second view (e.g., 760 in FIG. 7D) such that both graphs overlap each other over the predefined period of time. In doing so, the user can analyze the website user traffic as represented by different graphs corresponding to different attributes, and derive useful information therefrom. Note that the second view may also include the other features such as highlighting the user-selected annotation and including a message box in the second view.

Figure 7E:
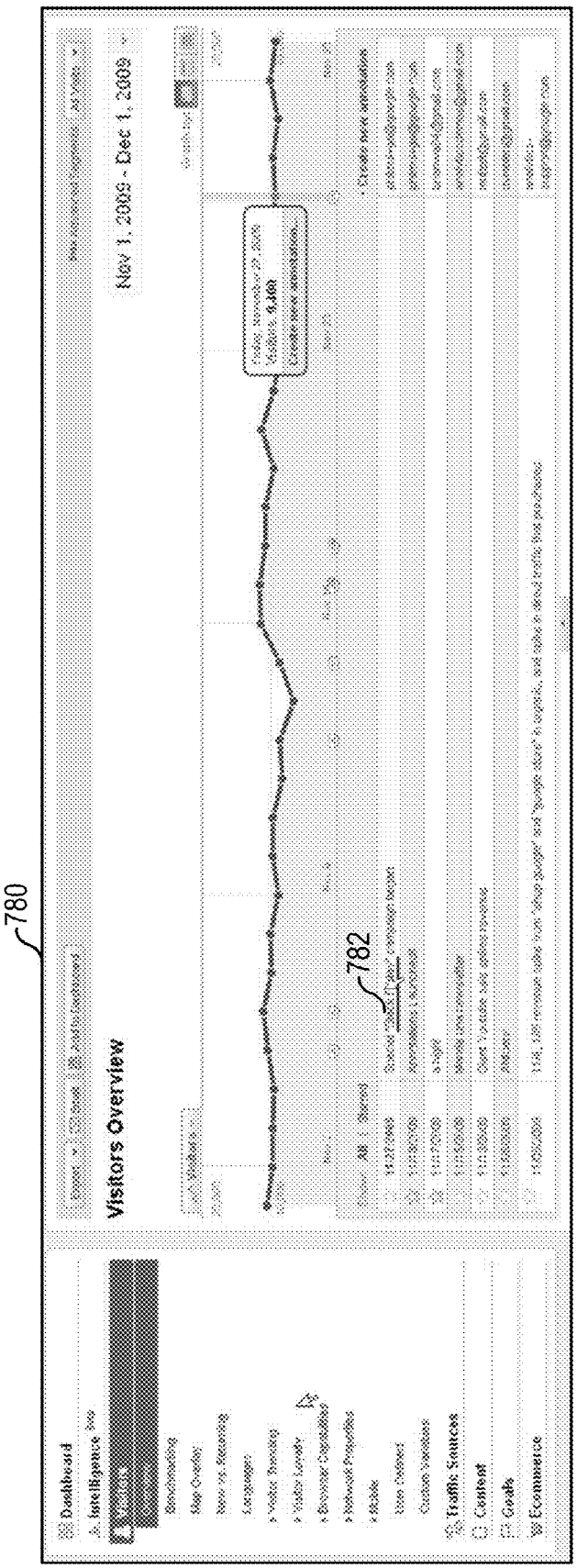

In some embodiments, the user-selected annotation includes a link to a document. For example, as shown in FIG. 7E, the annotation "Special 'Black Friday' campaign began" includes a link 782 to a webpage. In this case, upon receiving a user selection of the document link (711), the client device displays at least a portion of the document (e.g., the web page portion 784 in FIG. 7F) in the second view of the multidimensional dataset (713). Note that the content of the displayed portion of the document is relevant to the user-selected annotation.

Figure 7F:
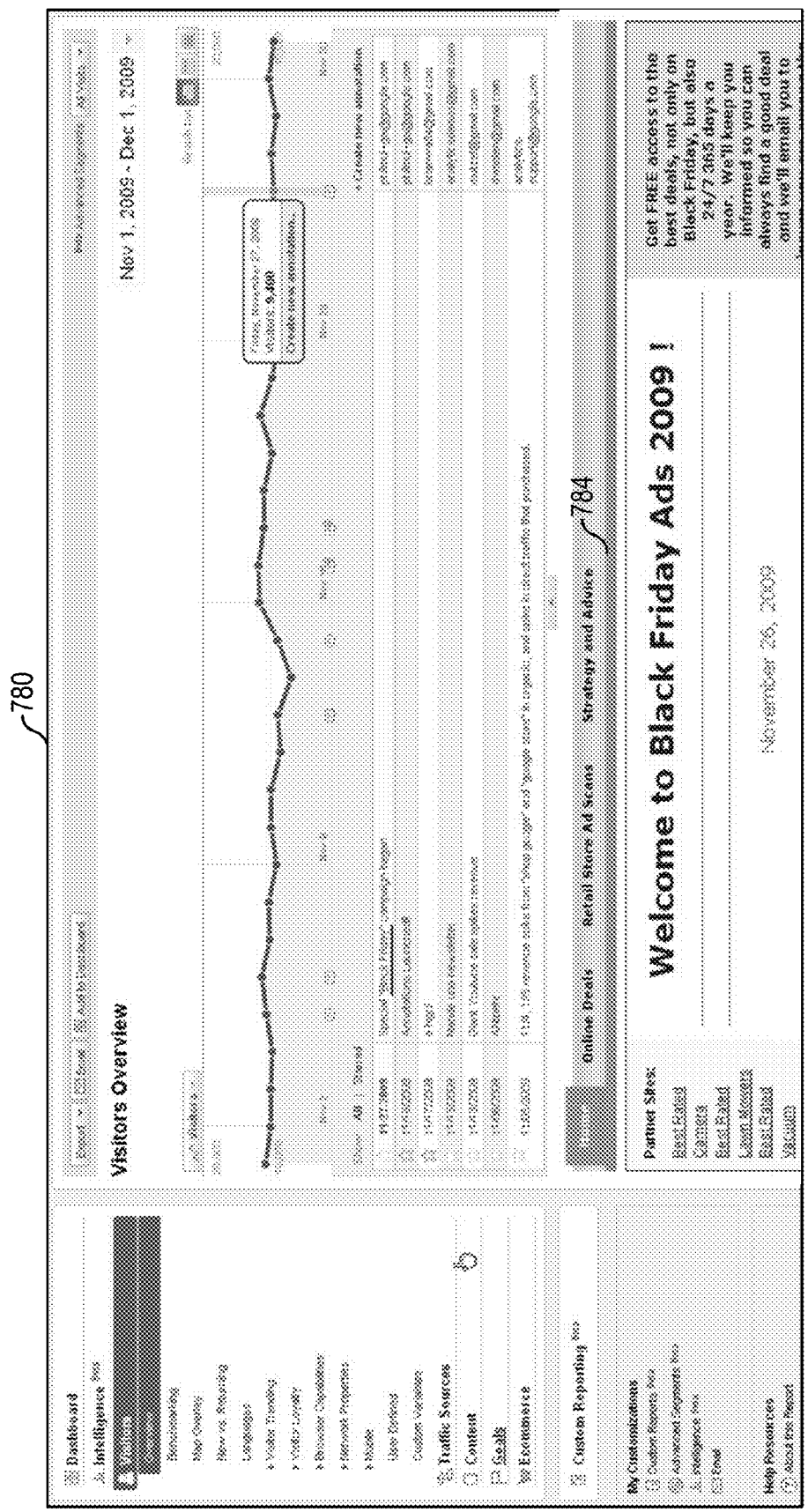

In some embodiments, the server system automatically generates annotation records for one or more specific dates. For example, the Friday right after the Thanksgiving is the traditional "Black Friday" in the US when many retailers may start off the holiday shopping season. In order to generate a potentially useful annotation, the server system automatically submits queries related to the subject, e.g., "Black Friday," "Halloween," "Christmas," etc., to a search engine (e.g., www.google.com), selects one or more the useful search results based on their relevance to the subject, and generates an annotation as shown in FIG. 7F that includes one or more links to the search results. In some embodiments, an annotation record that the server system automatically generates may not have a graph ID.

Figure 8A:
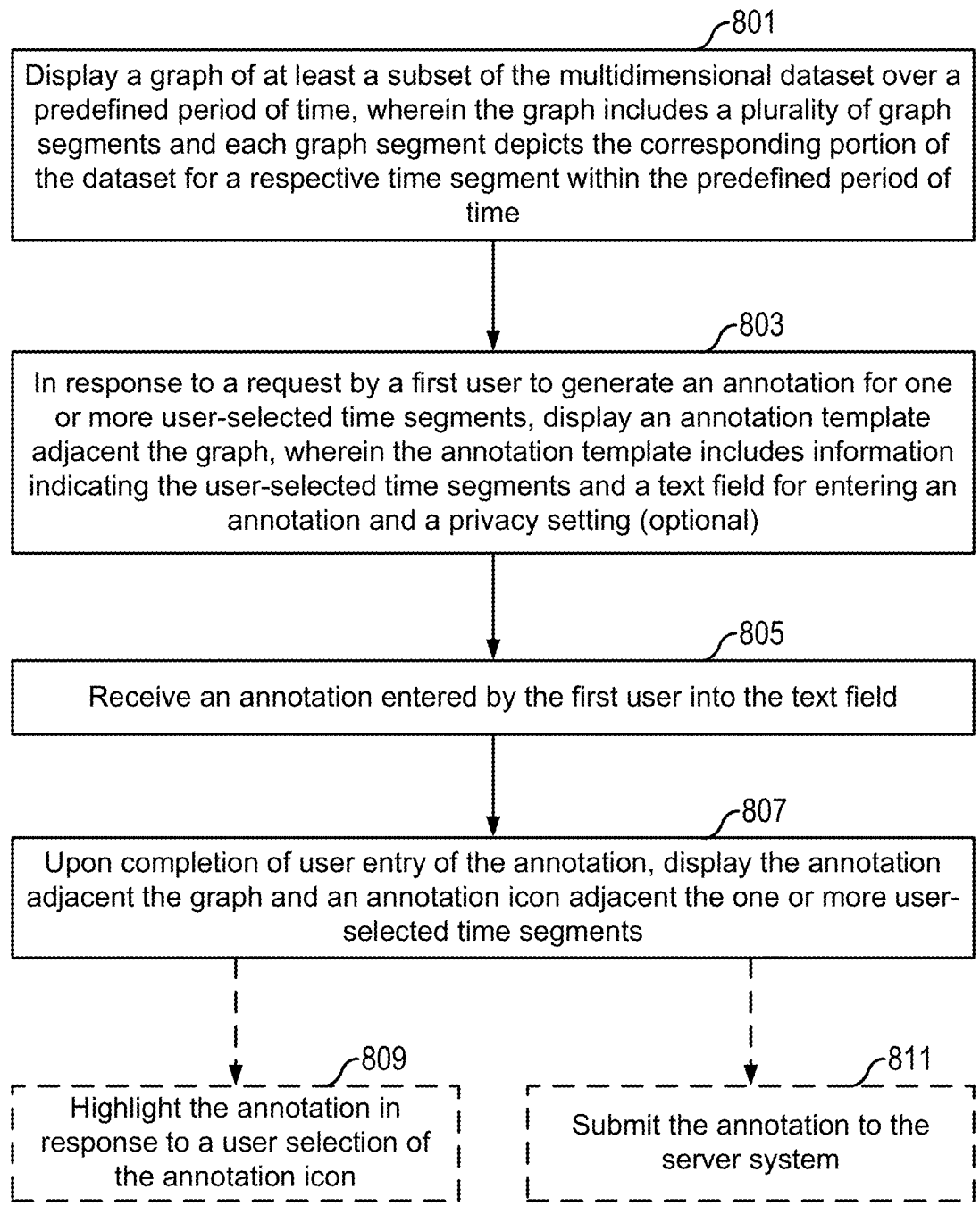
FIG. 8A is a flow chart of a computer-implemented method for generating an annotation record at a client device in response to user requests in accordance with some embodiments.
Figure 8B:
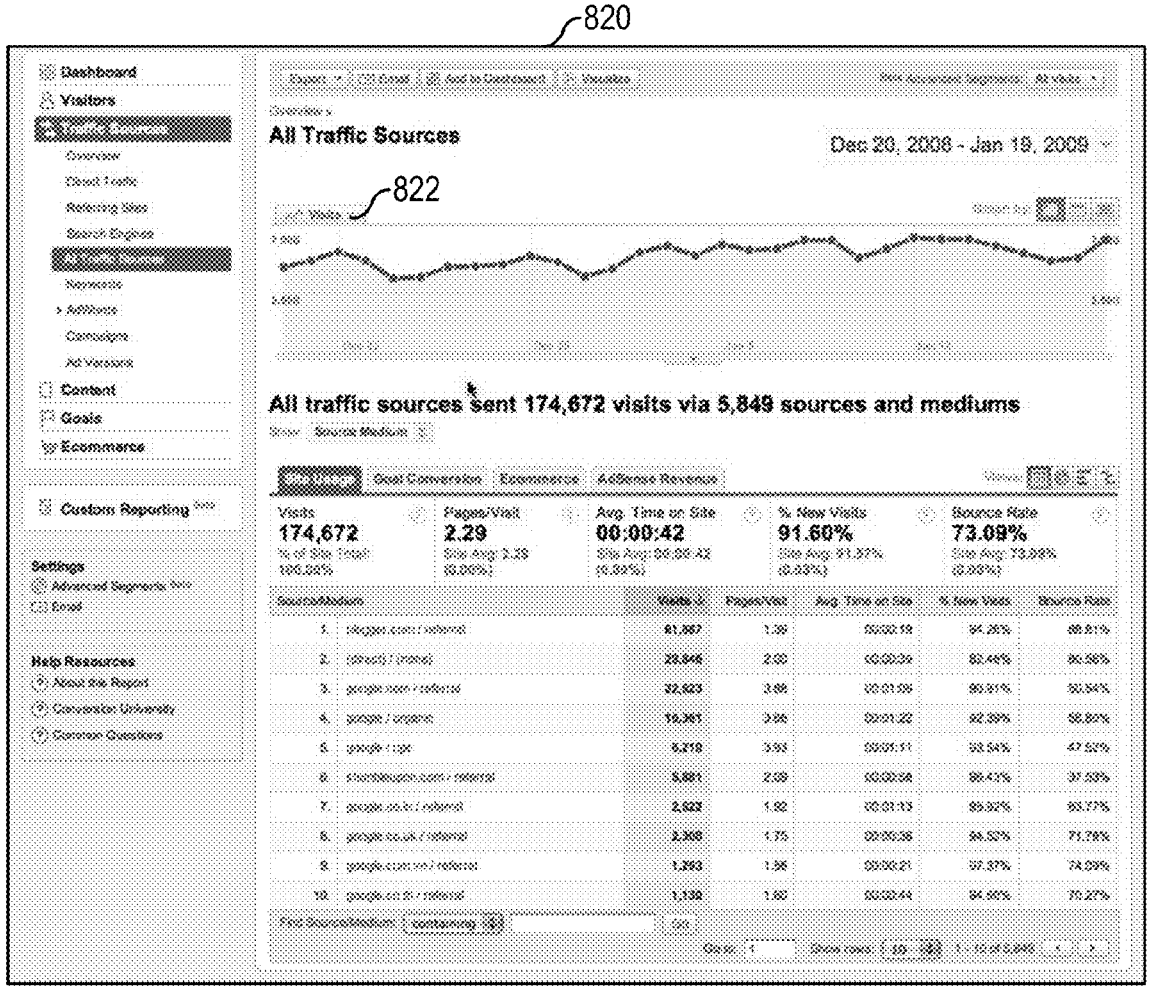
FIGS. 8B to 8F are screenshots illustrative of the computer-implemented method described in FIG. 8A in accordance with some embodiments.

FIG. 8A is a flow chart of a computer-implemented method for generating an annotation record at a client device in response to user requests in accordance with some embodiments. In some embodiments, the method of FIG. 7A is implemented in the client-side annotation module 532 (FIG. 5). FIGS. 8B to 8G are screenshots illustrative of the computer-implemented method described in FIG. 8A in accordance with some embodiments.

In response to a first user request, the client device displays a graph (e.g., the Visits graph 822 in FIG. 8B) of at least a subset of the multidimensional dataset over a predefined period of time (801). In some embodiments, the graph includes a plurality of graph segments and each graph segment depicts the corresponding portion of the dataset for a respective time segment within the predefined period of time.

Figure 8C:
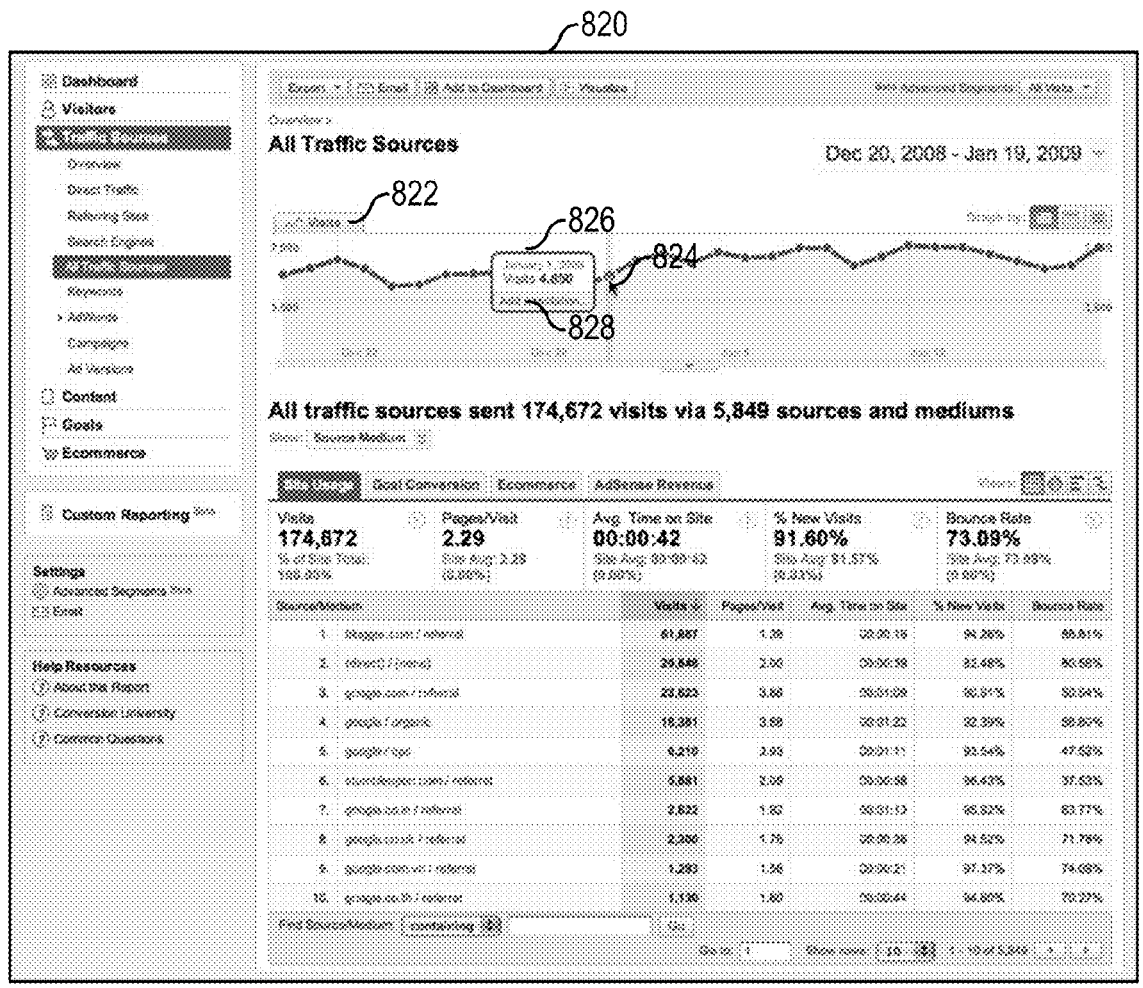
Figure 8D:
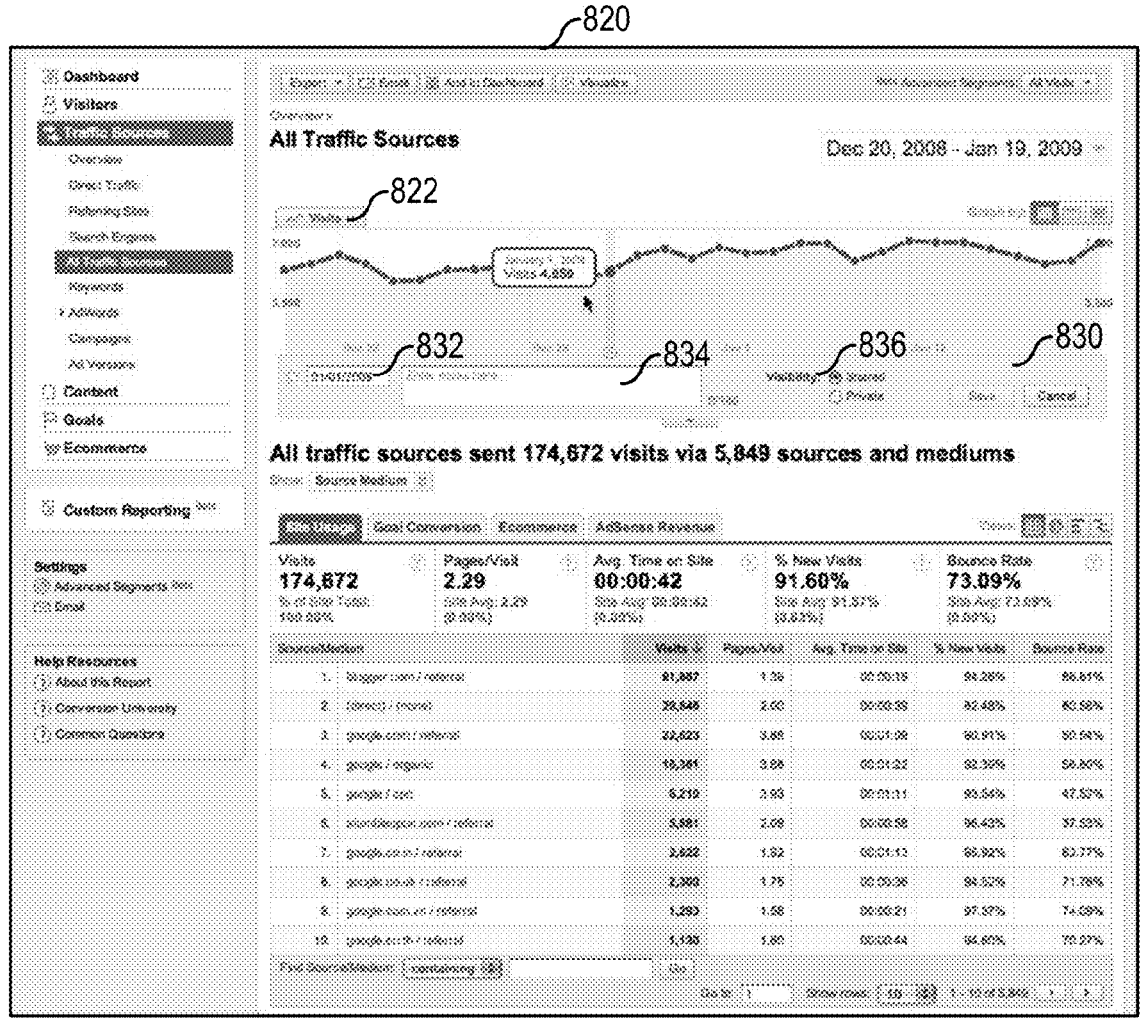
Figure 8E:
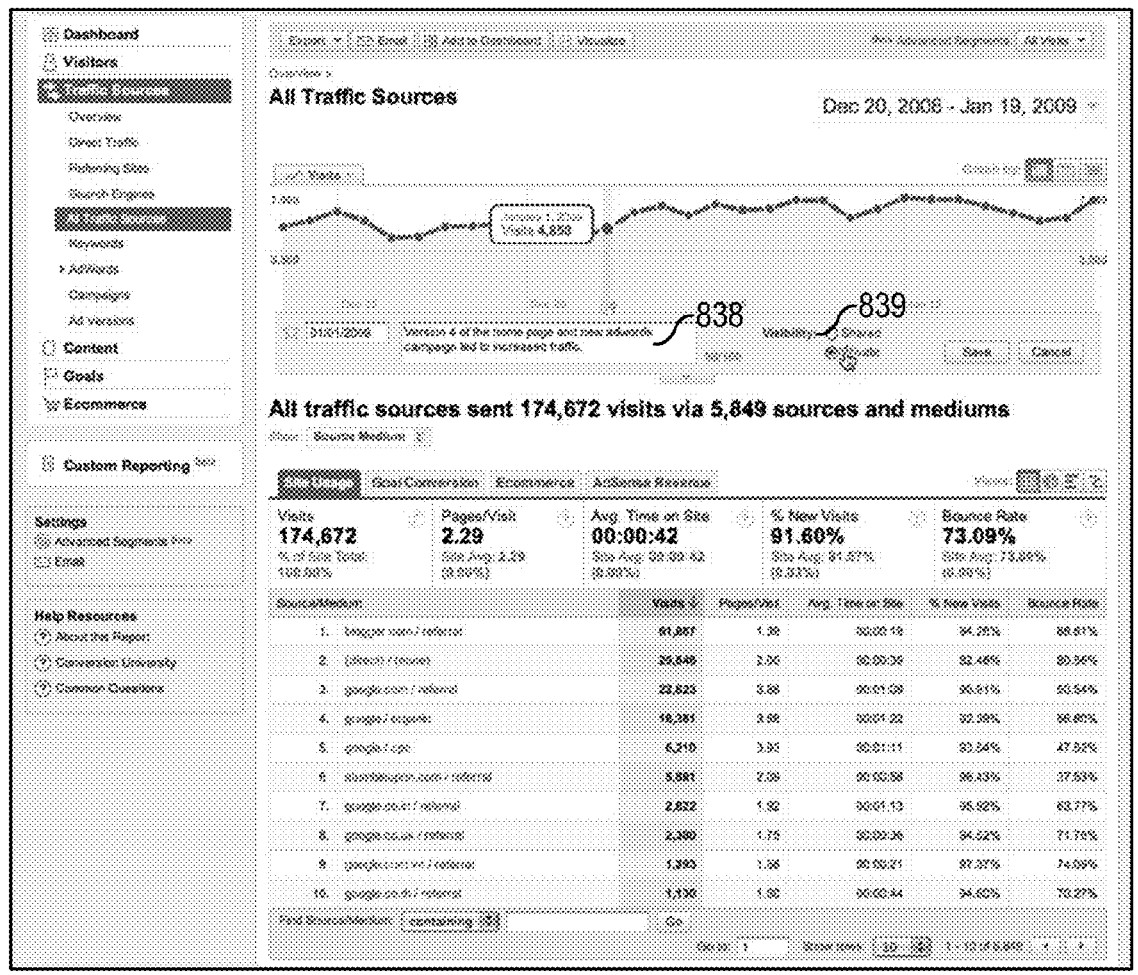

In response to a request by a first user to generate an annotation for one or more user-selected time segments, the client device displays an annotation template adjacent to the graph (803). FIG. 8C depicts that, when the user moves the mouse cursor 824 near the graph segment corresponding to Jan. 1, 2009, a small message box 826 pops up on the screen. The message box 826 includes a link 828 to add a new annotation for the graph 822. In response to a user selection of the link 828 (e.g., through a mouse click), the client device displays an annotation template 830 as shown in FIG. 8D. Note that the annotation template includes information indicating the user-selected time segments (e.g., 832 in FIG. 8D) and a text field (e.g., 834 in FIG. 8D) for entering an annotation.

The client device receives an annotation (e.g., 838 in FIG. 8E) entered by the first user into the text field (805). Upon completion of user entry of the annotation, the client device displays the annotation adjacent to the graph (e.g., 840 in FIG. 8F) and an annotation icon (e.g., 842 in FIG. 8F) adjacent to the one or more user-selected time segments (807).

In some embodiments, the annotation template includes a private annotation option (e.g., 839 in FIG. 8E) such that a user selection of the private annotation option prevents the annotation from being visible to any user other than the first user who generates the annotation. Note that the annotation 840 in FIG. 8F includes a "private" label indicating that this annotation is not visible, to those users other than the author who creates the annotation.

Figure 8F:
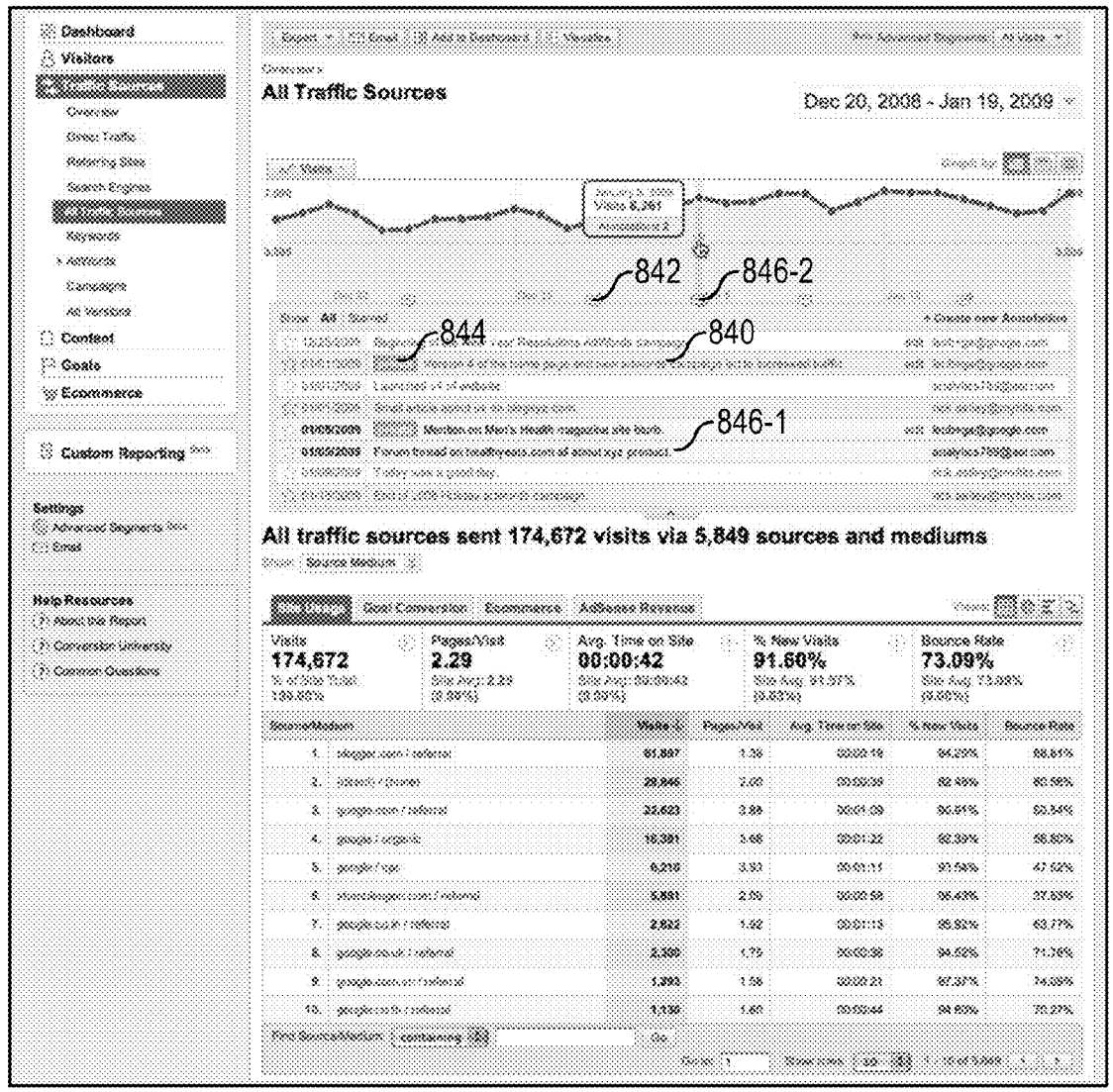

In some embodiments, the client device highlights the annotation in response to a user selection of the annotation icon (809). In some embodiments, the client device also submits the newly-generated annotation to the server system to be stored at the backend database 120 (811) such that the other users can access the annotation record (if it is shared). For example, FIG. 8F depicts that both annotations associated with the date of Jan. 5, 2009 are highlighted (846-1) in response to a user selection of the annotation icon (846-2).

Although some of the various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for displaying annotations for a multidimensional dataset, comprising:
   generating, by one or more processors, a first view of the multidimensional dataset comprising a first graph over a period of time that includes data from the multidimensional dataset across a first set of dimensions; receiving, at the one or more processors, annotation data for the first graph comprising a time segment within the period of time and a textual description;
   storing, by the one or more processors, an annotation comprising data indicative of the time segment, the textual description, and a graph identifier for the first graph;
   generating, by the one or more processors, a second view of the multidimensional dataset comprising the annotation and a second graph over the period of time that includes data from the multidimensional dataset across a second set of dimensions that differs from the first set of dimensions;
   receiving a selection of the annotation from the second view of the multidimensional dataset; retrieving, in response to the selection of the annotation from the second view, the graph identifier for the first graph;
   providing the first graph for display based on the retrieved graph identifier associated with the selected annotation;
   submitting, by the one or more processors, a query to a search engine for one or more dates;
   automatically generating, by the one or more processors, an annotation based on search results received from the search engine; and
   providing the automatically generated annotation as part of the second view of the multidimensional dataset.

2. The method of claim 1, wherein providing the first graph for display based on the retrieved graph identifier associated with the selected annotation comprises:
   providing the first graph for display as an overlay of the second graph.

3. The method of claim 1, further comprising:
   providing a message box for display on the second view that includes information that is derived from the multidimensional dataset and relevant to the selected annotation.

4. The method of claim 1, further comprising:
   associating a document with the annotation;
   providing a link to the document as part of the annotation on the second view of the multidimensional dataset;
   retrieving at least a portion of the document in response to a selection of the link; and
   providing the retrieved portion of the document for display as part of the second view of the multidimensional dataset.

5. The method of claim 1, wherein the first set of dimensions comprises a conversion rate.

6. The method of claim 1, further comprising:
   providing a link to one or more of the search results as part of the automatically generated annotation on the second view of the multidimensional dataset.

7. A system for displaying annotations for a multidimensional dataset comprising:
   one or more processors for executing programs; and
   memory to store data and to store one or more programs to be executed by the one or more processors, the one or more programs including instructions configured to cause the one or more processors to:
   generate a first view of the multidimensional dataset comprising a first graph over a period of time that includes data from the multidimensional dataset across a first set of dimensions;
   receive annotation data for the first graph comprising a time segment within the period of time and a textual description;
   store an annotation comprising data indicative of the time segment, the textual description, and a graph identifier for the first graph;
   generate a second view of the multidimensional dataset comprising the annotation and a second graph over the period of time that includes data from the multidimensional dataset across a second set of dimensions that differs from the first set of dimensions;
   receive a selection of the annotation from the second view of the multidimensional dataset; retrieve, in response to the selection of the annotation from the second view, the graph identifier for the first graph;
   provide the first graph for display based on the retrieved graph identifier associated with the selected annotation;
   submit a query to a search engine for one or more dates;
   automatically generate an annotation based on search results received from the search engine; and
   provide the automatically generated annotation as part of the second view of the multidimensional dataset.

8. The system of claim 7, wherein the one or more processors provide the first graph for display based on the retrieved graph identifier associated with the selected annotation by providing the first graph for display as an overlay of the second graph.

9. The system of claim 7, further comprising instructions configured to cause the one or more processors to display a message box that includes information that is derived from the multidimensional dataset and relevant to the user-selected annotation.

10. The system of claim 7, wherein the selected annotation includes a link to a document, the instructions further configured to cause the one or more processors to:
    receive a selection of the document link; and
    display at least a portion of the document in the second view of the multidimensional dataset, wherein the content of the displayed portion of the document is relevant to the user-selected annotation.

11. The system of claim 7, wherein the first set of dimensions comprises a conversion rate.

12. The system of claim 7, comprising instructions configured to cause the one or more processors to:
    provide a link to one or more of the search results as part of the automatically generated annotation on the second view of the multidimensional dataset.

13. A non-transitory computer readable-storage medium storing instructions that, when executed by one or more processors, cause the one or more processors to perform operations comprising:

generating a first view of the multidimensional dataset comprising a first graph over a period of time that includes data from the multidimensional dataset across a first set of dimensions; receiving annotation data for the first graph comprising a time segment within the period of time and a textual description;

storing an annotation comprising data indicative of the time segment, the textual description, and a graph identifier for the first graph;

generating a second view of the multidimensional dataset comprising the annotation and a second graph over the period of time that includes data from the multidimensional dataset across a second set of dimensions that differs from the first set of dimensions;

receiving a selection of the annotation from the second view of the multidimensional dataset; retrieving, in response to the selection of the annotation from the second view, the graph identifier for the first graph;

providing the first graph for display based on the retrieved graph identifier associated with the selected annotation;

submitting a query to a search engine for one or more dates;

automatically generating an annotation based on search results received from the search engine; and providing the automatically generated annotation as part of the second view of the multidimensional dataset.

14. The non-transitory computer readable-storage medium of claim 13, wherein providing the first graph for display based on the retrieved graph identifier associated with the selected annotation comprises:

providing the first graph for display as an overlay of the second graph.

15. The non-transitory computer readable-storage medium of claim 13, wherein the operations further comprise providing a message box for display that includes information that is derived from the multidimensional dataset and relevant to the selected annotation.

16. The non-transitory computer readable-storage medium of claim 13, wherein the selected annotation includes a link to a document, the operations further comprising: associating a document with the annotation;

providing a link to the document as part of the annotation on the second view of the multidimensional dataset;

retrieving at least a portion of the document in response to a selection of the link; and providing the retrieved portion of the document for display as part of the second view of the multidimensional dataset.

17. The non-transitory computer readable-storage medium of claim 13, wherein the first set of dimensions comprise a conversion rate.

18. The non-transitory computer readable-storage medium of claim 13, wherein the operations comprise:

providing a link to one or more of the search results as part of the automatically generated annotation on the second view of the multidimensional dataset.

* * * * *